Dec. 18, 1934.  F. A. BOND  1,984,392
AUTOMOBILE BUMPER
Filed April 22, 1931  3 Sheets-Sheet 2
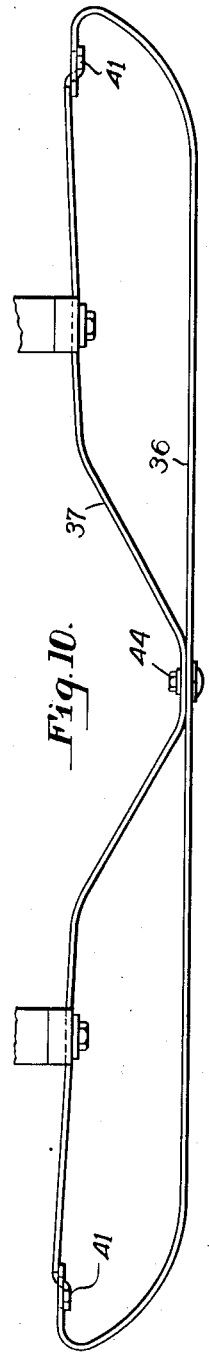
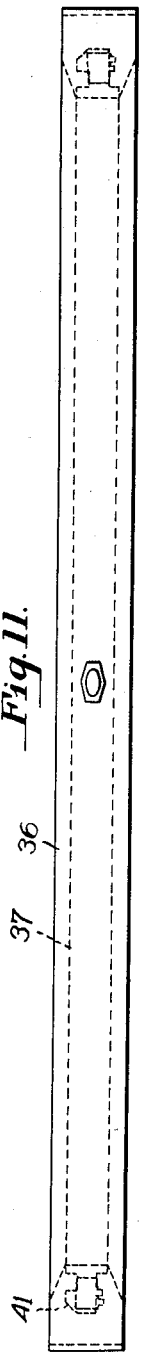
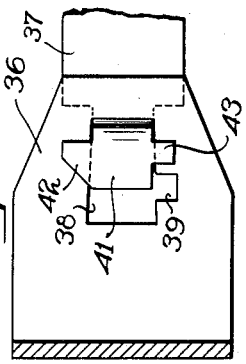
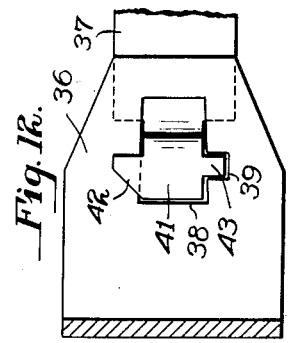
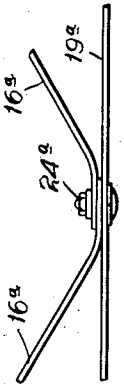
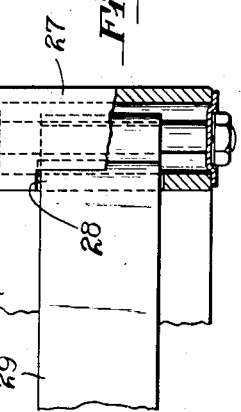
INVENTOR
Frank A. Bond,
By Archworth Martin,
Attorney.

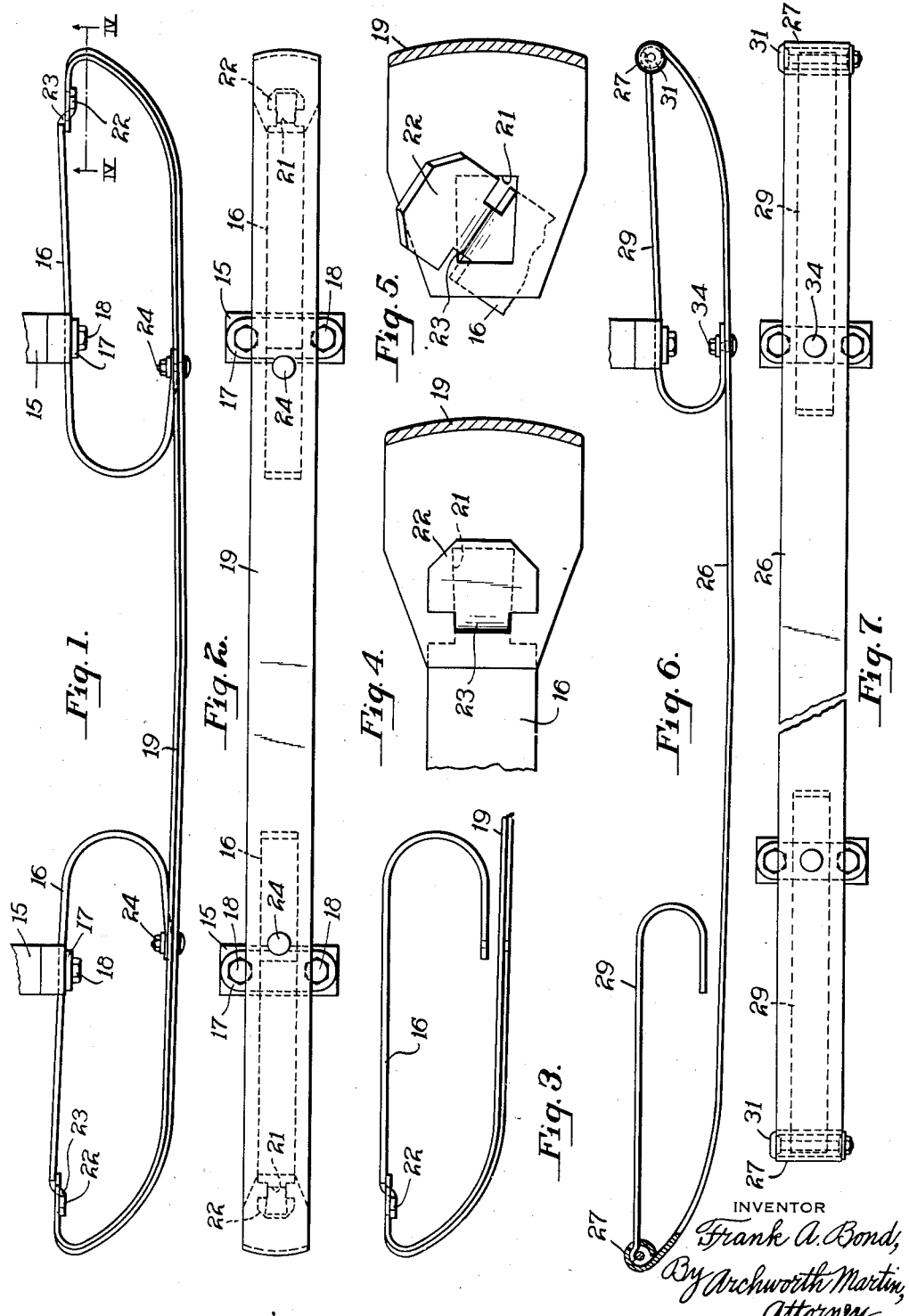

Dec. 18, 1934.    F. A. BOND    1,984,392
AUTOMOBILE BUMPER
Filed April 22, 1931    3 Sheets-Sheet 3
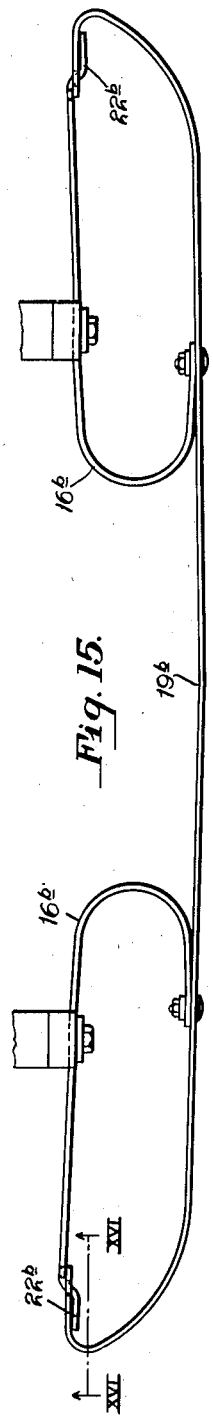
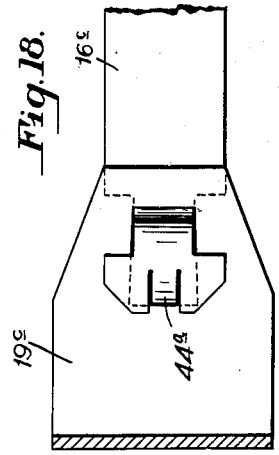
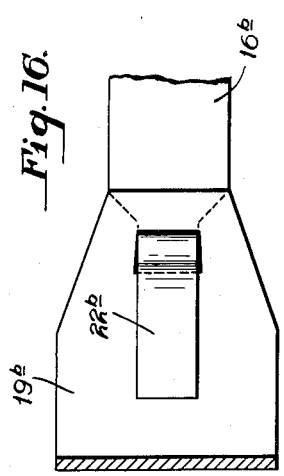
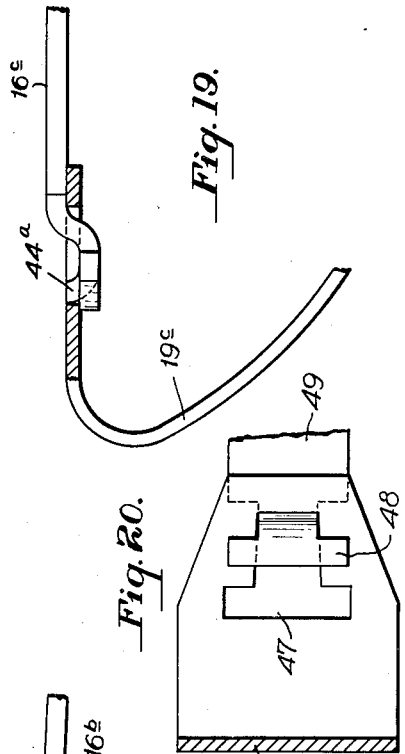
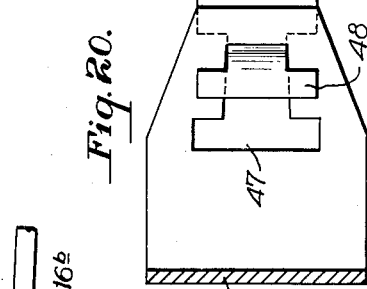
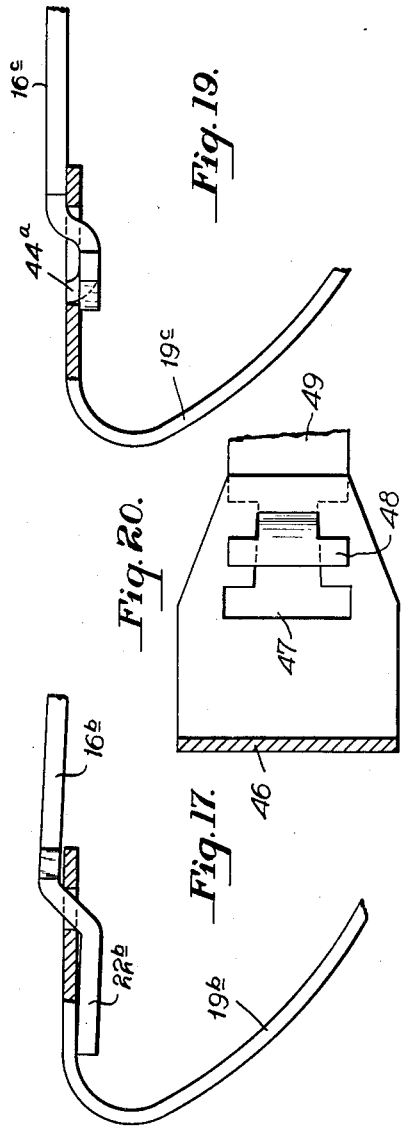
INVENTOR
Frank A. Bond,
By Archworth Martin,
Attorney.

Patented Dec. 18, 1934

1,984,392

UNITED STATES PATENT OFFICE 1,984,392

AUTOMOBILE BUMPER

Frank A. Bond, Pittsburgh, Pa., assignor, by mesne assignments, to The McKay Company, Pittsburgh, Pa., a corporation of Pennsylvania Application April 22, 1931, Serial No. 532,018

2 Claims. (Cl. 293—55).

My invention relates to automobile bumpers, and particularly to those of the spring bar or yieldable type, although certain features of the invention may be employed in connection with structures of other kinds.

One object of my invention is to provide an impact-receiving structure of such form that a minimum number of fittings, such as bolts, nuts, clamping plates, etc., are required.

Another object of my invention is to provide an impact structure of such form that component parts thereof are securely held against displacement relative to one another, with a minimum number of fastening devices.

A further object of my invention is to provide a bumper structure whose parts can be more easily and quickly assembled than bumper structures of various other types.

Still another object of my invention is to provide a bumper structure of generally simplified and improved form.

In the accompanying drawings, Figure 1 is a plan view of a bumper structure embodying my invention; Fig. 2 is a front elevational view thereof; Fig. 3 is a plan view of some of the parts of Fig. 1; Fig. 4 is a view taken on the line IV—IV of Fig. 1, on an enlarged scale; Fig. 5 is a view similar to Fig. 4, but showing the parts in only partially assembled condition; Fig. 6 is a plan view of a modified form of bumper structure; Fig. 7 is a front elevational view thereof; Fig. 8 is a horizontal sectional view, on an enlarged scale, through one end of the structure of Fig. 6; Fig. 9 is a rear elevational sectional view of said end.

Fig. 10 is a plan view showing another modification; Fig. 11 is a front view thereof; Fig. 12 is a view, on an enlarged scale, of an end portion of the structure of Fig. 11, with the parts in partially assembled position; Fig. 13 shows the parts of Fig. 12 in completely assembled relation; Fig. 14 shows a further modification; Fig. 15 shows a plan view of another modification; Fig. 16 is a view taken on the line XVI—XVI of Fig. 15; Fig. 17 is a sectional plan view of the structure of Fig. 16; Figs. 18 and 19 are views corresponding to Figs. 16 and 17, but showing still another modification, and Fig. 20 shows a further modification.

Referring first to Figs. 1 to 4, the bumper structure is shown as mounted upon the forward ends of vehicle side frames 15; the back bars or bracket arms 16 of the bumper structure being secured against the ends of the frame members 15 by means of clamping plates and screws 18. The front or impact-receiving bar is designated by the numeral 19 and may be either flat or of convex form on its forward side. The inturned extremities of the bar 19 are cut out, as indicated more clearly at 21 in Fig. 5, for the reception of tongues 22 that are formed on the outer ends of the back bars 16.

In assembling, the bars 16 and 19, the back bars 16 are tilted at an angle with respect to the impact bar 19 to permit insertion of the tongue 22 through the opening or perforation 21, somewhat after the manner shown in Fig. 5. The back bar may then be turned to the position shown in Fig. 3 and slid longitudinally of the opening 21 to bring the tongue to the position shown in Fig. 4, in which position the tongue 22 will lie against the inner face of the turned-in ends of the impact bar 19, while the body portion of the back bar will be disposed against the rear face of said extension.

The slot 21 is tapered so that when the tongue 22 is slid to the position shown in Figs. 3 and 4, the connecting web or neck 23, which is formed integrally with the bar 16 and the tongue 22 and connects them together, abuts against the upper and lower walls of the slot 21, to thereby prevent rattling through looseness of the parts. Furthermore, the portions 22 and 23 of the back bar 16 are so bent that the opposite or inner end of the bar will be sprung away from the impact bar 19, as shown in Fig. 3. Therefore, when the looped end of the bar 16 is clamped against the rear side of the impact bar 19 as by a bolt 24, the bars 16 and 19 will be maintained under tension with respect to one another.

Lost motion connection in one direction is provided between the ends of the impact bar 19 and the back bar 16, by reason of the slots 21. Thus, if thrusts are imposed endwise against the impact bar, such ends may thereby be sprung toward the vehicle frame independently of the tongues 22, thus reducing the rigidity of the impact structure at its ends without lessening its resisting capacity under greater stresses, which will be transmitted to the ends of the bars 16. The ends of the impact bar will, of course, return to their normal positions when the pressure thereon is removed.

So long as the bolts 24 remain in place there can be no disengagement of the bars 19 from the bars 16 at their outer ends, because of the interlocking connection afforded by the tongues 22. This form of connection requires no bolts in addition to the bolts 24, so that not only is there a saving in the cost of additional parts, but less time and labor is involved in assembling the structure.

Referring now to Figs. 6 to 9, I show a structure wherein the impact-receiving bar 26 has its ends bent to form eyes 27 as shown more clearly in Fig. 8. The eyes 27 have slots 28 cut therein to permit the insertion of the outer ends of the back bars 29, which ends are curved somewhat. After the ends of the back bars 29 have been inserted in the eyes 27, it will be seen that by reason of the curvature of the ends of the bars 29 they cannot be withdrawn from the eyes 27 when the parts are fully assembled. The bolts 31 are employed mainly to produce a finished or ornamental appearance.

Furthermore, the bolts 31 will largely be relieved of bending strains or thrusts because when thrusts are imparted to the impact structure in one direction, they will be transmitted directly from the bar 26 to the bar 29 through the contacting surfaces thereof at 32, while in the opposite direction the thrust will be transmitted from one bar to the other at the point 33. The back bars 29 are held against vertical displacement by the upper and lower walls of the slots 28.

The parts are so shaped that the back bars 29 tend to lie in spaced relation to the impact bar 26, as shown at the left hand side of Fig. 6. Therefore, when the looped end of the bars 29 are connected to the impact bar 26 as by bolts 34, the parts are placed under tension and the impact bars 29 held snugly in contact with the eyes 27 at the points 32 and 33.

Referring now to Figs. 10 to 13, I show a structure having an impact-receiving bar 36 and a single back bar 37. The inturned ends of the impact bar 36 are provided with elongated slots 38 similar to the slots 21 of Fig. 5, but each having its lower wall recessed at 39. The ends of back bar 27 are of different form than the back bars 16. The tongues 41 formed on the ends of the back bar have extensions 42 on the upper edges thereof and narrower extensions 43 on the other lower edges.

The bars are assembled by tilting the back bar slightly to permit insertion of the tongue extensions 42 through the slots 38, whereupon the bar 37 is tilted in the opposite direction and the ends of the impact bar 36 are sprung inward to permit movement of the tongues 43 through the slot openings 39, so that both the extensions 42 and 43 will lie at the inner side of the back-turned ends of the impact bar 36, as shown in Fig. 10. Release of the ends of the bar 36 will thereupon permit the tongue 41 to move from the position shown in Fig. 12, to that shown in Fig. 13, so that the parts cannot be disconnected until the ends of the bar 36 are sprung toward one another and the bars 36 and 37 simultaneously tilted relative to one another.

The mid portions of the bars 37 and 36 are shown as connected by a bolt 44. This connection not only serves to maintain the impact structure under tension but will prevent such relative tilting thereof as will permit movement of the tongue extension 43 through the opening 39, should an end of the bar 36 be sprung inward under impact.

That is to say, if an impact be imposed against the bar 36 in an endwise direction, the tongue extensions 42 and 43 will simply slide along the inner surface of the impact bar 36 without the bars 36 and 37 being tilted in such manner that the tongue extension 43 will be pushed through the slot 39. Of course, when the bolt 44 is removed, the parts can be disassembled by springing in the ends of the impact bar and simultaneously tilting it.

Referring to Fig. 14, I show a structure which may constitute a modification of either Figs. 1 or 6. In this arrangement, the bar 19a corresponds to either the bar 19 or the bar 26, while the back bars 16a may correspond to either the back bars 16 or 29. In this structure, the inner ends of the bars 16a, instead of being bent to semi-circular or loop form, extend to the central portion of the front bar and are secured thereto by a bolt 24a, thereby serving to yieldably brace the mid portion of the impact bar 19a. The ends of the bars 16a and 19a may be connected together as shown either in Fig. 1 or Fig. 6.

Figs. 15 and 16 show a structure wherein the slots in the ends of the impact bar 19b are much smaller than are the slots 21. The tongues 22b are narrow relative to the tongues 22 and can be readily slid into the slots, but they are of such length that when the back bars 16b are bolted at their inner ends to the impact bar, the tongues cannot become displaced from the slots.

Figs. 18 and 19 show a structure wherein the impact bar 19c and the back bars 16c are formed similarly to the bars 16 and 19 of Fig. 1, but in this modification, the tongues have a lip 44 struck therefrom in position to abut against the inner end wall of the slot when the parts are in assembled position, to rigidly hold the ends of the bars 16c and 19c against relative sliding movement through thrusts imposed endwise against the impact bar 19c.

Fig. 20 shows a structure somewhat similar to that of Figs. 12 and 13, the impact receiving bar 46 having a T-shaped slot 47 through which a T-shaped tongue 48 of a back bar 49 may be inserted when the ends of the impact bar are sprung inwardly as in Fig. 12. When the bar ends are released, they will move to the position shown in Fig. 20 with the tongue 48 lying behind the front bar 46 and the body portion of the back bar 49 lying against the outer side of the impact bar. If the back bar 49 instead of being made in a single piece as in Fig. 10 be made in two parts as in Fig. 1, it will not be necessary to spring the ends of the impact bar inwardly in order to permit assembly of the bars since the tongue 48 can be simply passed through the T slot 47 and slid to the position shown in Fig. 20, and thereupon the inner end of the back bar bolted to the front bar as at 24 in Fig. 1. The back bar 49 need not be twisted or tilted as does the bar 27 in assembling the parts since both ends of the tongue 48 can be simultaneously passed through the slot 47.

Various changes in detail and general arrangement may be made in the structure as described, without departing from the spirit and scope of the invention as defined in the accompanying claims. For example, the front bar could be provided with tongues, and the perforations formed in the outer end of the back bar.

I claim as my invention:—

1. Bumper structure comprising front and back bars, one of said bars having a perforation extending in a direction approximately parallel to the longitudinal axis of the bar and having a vertically-extending recess in one of its longitudinal walls, a tongue-like projection at one end of the other bar provided with vertical extensions on its upper and lower edges, one of said extensions being of smaller dimension than the said recess, and the other extension being insertible through the perforation, the tongue being of smaller width than said perforation, and means for holding the said bars in assembled relation when said tongue lies within the perforation and the said extensions are disposed behind the first-named bar.

2. Bumper structure comprising front and back bars, one of said bars having a perforation extending in a direction approximately parallel to the longitudinal axis of the bar and having a vertically-extending recess in one of its longitudinal walls, a tongue-like projection at one end of the other bar provided with vertical extensions on its upper and lower edges, one of said extensions being of smaller dimension than the said recess, and the other extension being insertible through the perforation, the tongue being of smaller width than said perforation, and means for holding the said bars in assembled relation when said tongue lies within the perforation and the said extensions are disposed behind the first-named bar, the said recess being located in spaced relation to the end walls of the said perforation.

FRANK A. BOND.